United States Patent [19]

Burgkhardt et al.

[11] Patent Number: 5,059,806
[45] Date of Patent: Oct. 22, 1991

[54] GAS DOSIMETER READING METHOD AND APPARATUS

[75] Inventors: Bertram Burgkhardt, Karlsruhe, Fed. Rep. of Germany; Tatsuyo Ishidoya, Shizuoka, Japan

[73] Assignees: Kernforschungszentrum Karlsruhe GmbH, Karlsruhe, Fed. Rep. of Germany; Toshiba Glass Co. Ltd., Tokyo, Japan

[21] Appl. No.: 583,013

[22] Filed: Sep. 17, 1990

[30] Foreign Application Priority Data

Sep. 18, 1989 [JP] Japan ................... 1-239869

[51] Int. Cl.⁵ .............................................. G01T 1/06
[52] U.S. Cl. .............................................. 250/484.1
[58] Field of Search ........................... 250/484.1 C

[56] References Cited

U.S. PATENT DOCUMENTS 3,412,248 11/1968 Kastner et al. ............. 250/484.1 C
4,816,691 3/1989 Faatz ......................... 250/484.1 C
4,880,986 11/1989 Yamada et al. ............. 250/484.1
4,922,115 5/1990 Mawatari et al. ........... 250/484.1 C

FOREIGN PATENT DOCUMENTS 0292582 12/1986 Japan ........................ 250/484.1 C Primary Examiner—Carolyn E. Fields
Assistant Examiner—Drew A. Dunn

[57] ABSTRACT

A method and apparatus for reading a glass dosimeter in which a fluorescent glass element after exposure to ionizing radiation is subjected to ultraviolet light pulses so as to generate fluorescence pulses which are sampled in different sampling periods for determination of the exposure dose of the glass element by utilizing a fluorescent pulse component in a particular wavelength range. Preferably, concurrently an unexposed sample glass is subjected to the same UV light pulses and its fluorescence is subtracted from the exposure dose value in order in eliminate the base dose inherent to a particular glass for improved accuracy.

4 Claims, 6 Drawing Sheets

GAS DOSIMETER READING METHOD AND APPARATUS

BACKGROUND OF THE INVENTION

Field of the Invention

This invention relates to a method of reading glass dosimeters for use radiation dosimetry and the like and an apparatus for reading the glass dosimeter, and in particular, to a method and an apparatus for reading the radiation dose of a fluorescent glass element at a high sensitivity and with high accuracy.

Description of the Prior Art

For radiation protection monitoring, the operators of a nuclear reactor, an accelerator, an X-ray generator or a radioisotope device must carefully control radiation, and it is necessary for the operators handling such radiation generating systems to measure their individual doses. Thus, it has become very important to read the exposure dose of every dosimeter separately and control the dose data properly.

When a conventional radiophoto-luminescence dosemeter is used, a glass element holder 2 in which a fluorescent glass element 1 is mounted is inserted into a lower case 3 as shown by an arrow A in FIG. 8, and then the lower case 3 is installed in an upper case 4 as shown by an arrow B. The fluorescent glass element 1 is transported to, or installed in, a proper place in a so-called capsulized state. At the time of reading the exposure dose of the fluorescent glass element 1, the glass holder 2 is taken out from the upper and lower cases 4 and 3, and is disposed in a predetermined reading position. Thereafter, the read-out is carried out for the exposure dose received by fluorescent glass element 1.

As shown in FIG. 9, when exciting ultraviolet rays 5 are transmitted to the fluorescent glass element 1 after exposure to the radiation, red-orange light of radio-photo luminescence 6 (hereinafter called as RPL) corresponding to the exposure dose is emitted from a fluorescent light detecting surface which is oriented in a direction different from the direction of the ultraviolet rays transmitted to the fluorescent glass element. The exposure dose of the fluorescent glass element 1 is measured by reading the RPL.

The fluorescent light 6 emitted from the fluorescence light detecting surface of the fluorescent glass element 1 after the exciting ultraviolet rays 5 have been supplied thereto comprises a fluorescent light component generated by the exposure to UV radiation and a fluorescent light component (predose component) which is intrinsic to the fluorescent glass element 1 and exists without the exposure to radiation. Thus, in order to obtain the true radiation induced RPL, the amount of the predose component must be subtracted from the total amount of the fluorescent light generated in the fluorescent glass element 1.

In view of the fact that the decay time constants of RPL are greatly different from each other, the inventors of this invention have proposed a method and an apparatus for reading only the RPL efficiently (as described in Japanese Unexamined Patent Application Publication No. Sho 59-190681), and for reading RPL by delaying the impressing time of the dynode voltage of a multiplier and suppressing the detecting sensitivity of the predose (basedose) which decay more quickly (as described in Japanese Unexamined Patent Application Publication No. Sho 61-292582).

After various studies of the measurement of radiation dose, the following problems were pointed out:

(1) One problem exists in the predose. The decay of one predose component is slower than that of the other predose component. Even if the detecting sensitivity of the predose component having the faster decay is suppressed, the effect of the predose component having the slower decay remains, since this slower predose component is fairly larger than RPL emitted from low radiation dose. In other words, it is very difficult to detect the RPL with a high sensitivity and high accuracy by suppressing the detecting sensitivity for the predose component having the faster decay, which is a part of the fluorescent light 6 generated in the fluorescent glass element 1 excited by the ultraviolet rays, and by subtracting the predose having the slower decay.

(2) Another problem exists in the intensity distribution of fluorescent light. With the conventional method, exciting ultraviolet pulses produced by a nitrogen gas laser unit are emitted to a fluorescent glass element 1 when the deviation of the intensities of the exciting ultraviolet pulses changes the intensities of the fluorescent pulses generated in the fluorescent glass element. A part of the exciting ultraviolet pulses are emitted to a reference fluorescent glass element. After the deviations of the intensities of the fluorescent pulses produced in the fluorescent glass element 1 exposed to radiation and the reference fluorescent glass element have been obtained, the intensity of the ultraviolet pulses is corrected on the basis of the intensity deviation of the reference glass.

When the exciting ultraviolet light pulses are separated and parts thereof are supplied to the reference fluorescent glass element, however, the intensity ratios of the ultraviolet pulses transmitted to the fluorescent glass element exposed to radiation and the reference fluorescent glass element vary because the intensity distribution in a plane perpendicular to the direction of the exciting ultraviolet pulses are different depending on the distances from the nitrogen gas laser unit. Thus, it is also difficult to read the intensity of the fluorescent light at a high accuracy.

(3) A further problem resides in the correction of the decay time constant of the predose or basedose components. Since the predose component having a slower decay is detected at a delayed sampling time, the intensity of this predose is decayed in accordance with the decay time constant. To compensate for the decay, it is necessary to multiply the read-out fluorescent intensity by a correction factor in order to find the exposure dose of the fluorescent glass element. Since, however, each fluorescent glass element may have a different decay time constant, the correction factors of fluorescent glass elements must be carefully considered when the radiation exposure is determined.

It is preferable that the correction factors of each fluorescent glass element should be separately determined. However, it is very complicated as the operator must set and input the correction factors for each fluorescent glass element, and the correction factors corresponding to the respective fluorescent glass elements must be separately selected at a time of continuous measurement. In order to avoid this complicated process, a representative constant is selected as the correction factor, resulting in lowering the measurement accuracy. This is also true for the correction of the sensitivity of the fluorescent glass elements.

This invention was made in view of the above situation and provides a method and an apparatus for reading the exposure dose of fluorescent glass element at a high sensitivity and at a high accuracy by picking up reduced amounts of the predose components of a fluorescent glass element.

Another object of this invention is to provide an apparatus for reading exposure dose by detecting the fluorescent intensity from a fluorescent glass element at a high accuracy without the influence of the errors of the exciting ultraviolet intensity distribution.

A further object of this invention is to provide an apparatus in which the correction factors of individual fluorescent glass elements are suitably determined, the exposure dose of every fluorescent glass element is obtained, and the reliability of the radiation exposure determination is enhanced.

SUMMARY OF THE INVENTION

With the invention, a wave-length selecting element is provided between a photo-electric detector and a fluorescent glass element constituting a part of a glass dosemeter read-out unit, for selectively filtering a fluorescent pulse component in a specific wavelength range.

An optical system for transmitting a part of exciting ultraviolet pulses to a fluorescent glass element exposed to radiation and transmitting another part of the exciting ultraviolet pulses to a reference fluorescent glass element is provided such that the intensity distributions of the exciting ultraviolet pulses transmitted to both the fluorescent glass elements are rendered equal to each other. In an embodiment thereof, the fluorescent glass element exposed to radiation and the reference glass element are disposed at the positions separated by the same optical distance from a nitrogen gas laser unit.

Further, this invention provides an apparatus comprising a recognition code reading device for reading a recognition code attached to a glass element holder holding a fluorescent glass element and/or a dosemeter receiving the glass element holder, data memory device for storing correction data for fluorescence attenuation characteristics and/or for sensitivities which are different from each other in accordance with fluorescent glass elements, and an operation and processing device for read-out the corresponding correction data from the data memory device in accordance with the recognition codes read by the recognition code reading means and for calculating exposure dose of each fluorescent glass element.

With the invention, the dose measurement is carried out in such a state that the effect of the predose component having a slower decay characteristic is substantially suppressed by subtracting from the fluorescent pulses the effect of the predose component before exposure, which is intrinsic to a fluorescent glass element on one hand, and by selecting a fluorescent pulse component in a specific wavelength range in which the RPL corresponding to the exposure dose appears most prominently. Since the ratio of the predose to the RPL is small, the subtracted amount of the predose is also small, thereby enhancing the resolving power of the operation. As a result, the exposure dose of the fluorescent glass element exposed to radiation is measured at a high accuracy.

With the invention, the provision of a wavelength selecting element for filtering fluorescent pulse element in a specific wave-length range which is disposed between the fluorescent glass element and a photoelectric detector renders the structure of the reading apparatus very simple. Moreover, since the predose intrinsic to the fluorescent glass element before exposure is low, the pulse component which most prominently exhibits the RPL corresponding to the exposure dose can be selected and the predose in the specific wavelength range is suppressed, the sensitivity of the photoelectric detector is increased. Therefore, a very low RPL intensity can be detected with high sensitivity.

Further, the exciting ultraviolet pulses generated in the nitrogen gas laser are supplied to the fluorescent glass element exposed to radiation and the standard fluorescent glass element with the same intensity distribution. Thus, if the intensity or the intensity distribution of the exciting fluorescence pulses varies, they are emitted to both the fluorescent glass elements in a similar manner. Therefore, the ratios of the fluorescent pulses emitted from the fluorescent glass elements are rendered constant and the deviations of the intensity and the intensity distribution of the exciting ultraviolet pulses are without influence.

Still further, the recognition codes, the correction factors of fluorescent decay characteristics and the correction factors of the sensitivity characteristics for respective fluorescent glass elements are previously stored in a data memory device, and then the fluorescence is read together with the recognition code attached to the glass element holder or the dosimeter and is corrected, whereby the exposure dose of each fluorescent glass element is measured.

DESCRIPTION OF THE PREFERRED EMBODIMENTS

An embodiment of the method and apparatus for reading glass dosimeters in accordance with this invention will be explained with reference to FIGS. 1 and 2.

Figure 1:
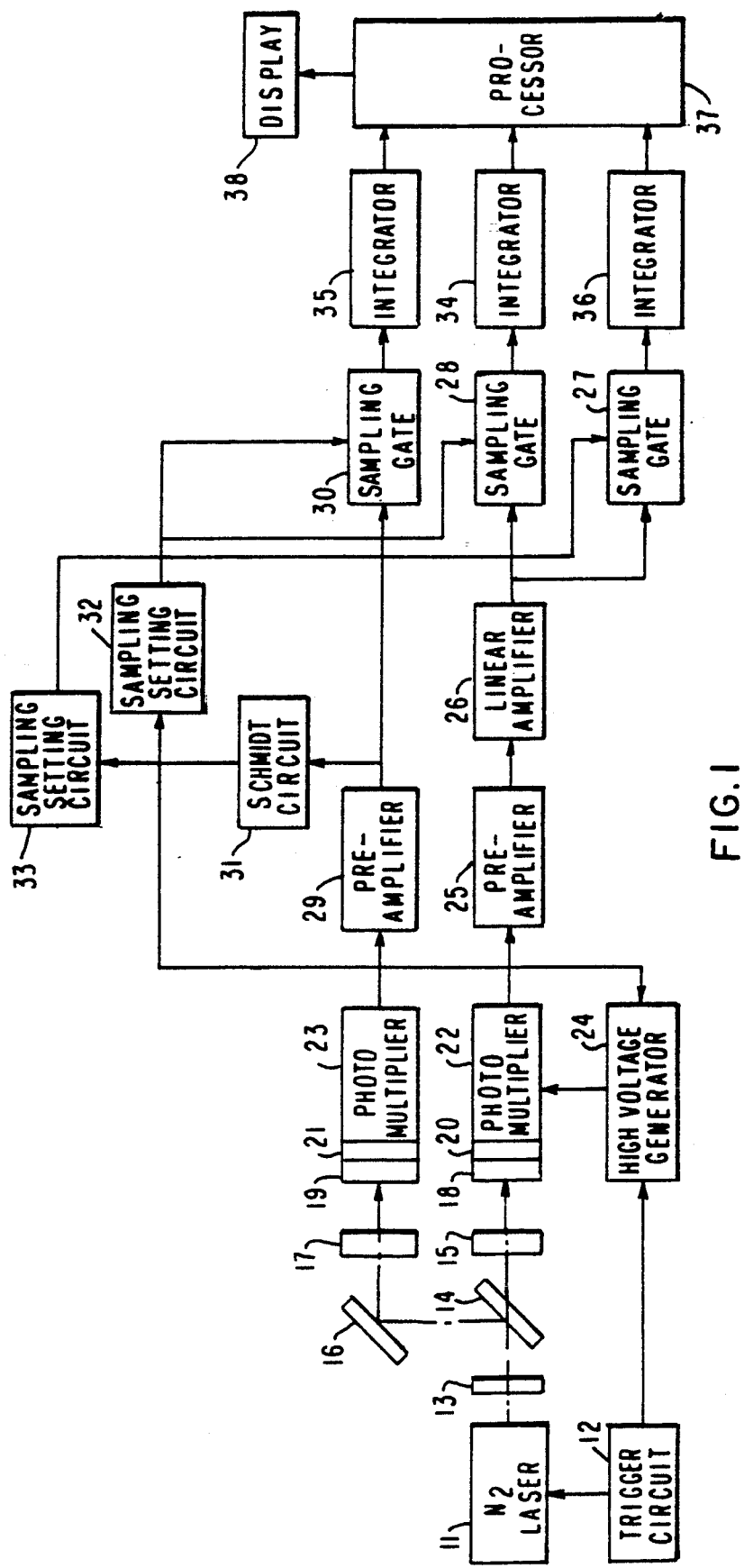
FIG. 1 is a block diagram showing a method of reading glass dosemeter according to this invention.

In FIG. 1, a nitrogen gas laser unit denoted at 11 is started by an instantaneous high voltage impressed by a trigger circuit 12 and produces ultraviolet laser pulses of a pulse width of 5 to 10 ns and a wavelength of 337.1 nm. After the ultraviolet pulses has passed a color filter 13, the stray light such as scattered light is removed therefrom, and only the ultraviolet rays having a wavelength of 337.1 nm is selected. Thereafter, the pulsed ultraviolet rays are transmitted to a semitransparent mirror 14 made of fused silica glass or the like and are divided in two thereon. One part of the divided pulsed ultraviolet rays travel straight through the semitransparent mirror 14 and are emitted to a fluorescent glass element 15 exposed to radiation. The other part of the divided pulsed ultraviolet rays are reflected on the semitransparent mirror 14 and are again reflected on a reflecting mirror 16 arranged in the next stage. Then they are supplied to a standard fluorescent glass element 17. The reference fluorescent glass element 17 is made of, for example, silver-activated phosphate glass not previously exposed to radiation rays. The reference fluorescent glass element 17 is used for correcting the output deviation of the nitrogen gas laser. Since RPL generated by the ultraviolet excitation depends on the intensity of the exciting ultraviolet rays, that is, the intensity of the laser, the measured value of the RPL is corrected with reference to the fluorescent light from the reference fluorescent glass element 17, as described later.

When the exciting ultraviolet pulses are emitted, fluorescent pulses corresponding to the exposure dose are generated at the detecting side face of the fluorescent glass element 15, and reference fluorescent pulses are produced at the detecting side face of the reference fluorescent glass element 17. After the two kinds of fluorescent pulses have passed corresponding ultraviolet ray eliminating filters 18 and 19, these pulses are sent to photomultiplier tubes 22 and 23 via wavelength selecting elements 20 and 21 such as interference filters. A high voltage generating circuit 24 receives from the trigger circuit 12 a starting signal which is output at the same time as the nitrogen gas laser unit 11 outputs the signal, or receives an output from a Schmidt circuit as described later. Then, the detecting sensitivity is controlled. The control of the sensitivity is made by elevating the detection sensitivity of the dynode voltage of the photomultiplier tubes 22 at the time when the rapidly decayed predose component of the emitted fluorescent pulses is sufficiently small, thereby increasing the detection sensitivity of the photomultiplier tubes 22.

The ultraviolet light eliminating filters 18 and 19 have the function of preventing any exciting ultraviolet pulses to be input to the photomultiplier tubes 22 and 23, and the wavelength selecting elements 20 and 21 have the function of enabling only the rays of the fluorescent pulse component in the specific wavelength range to pass therethrough.

The emitted fluorescent pulses detected by the photomultiplier tube 22 are linearly treated by a linear amplifier 26 via a preamplifier 25 and are sent to first and second sampling gates 27 and 28. The reference fluorescent pulses detected by the photomultiplier tube 23 are amplified by a preamplifier 29 at a predetermined amplification degree and are sent to a third sampling gate 30.

A Schmidt circuit designated at 31 sends, at the predetermined time after it has detected the reference fluorescent pulses, pulse signals having a predetermined amplitude and the like to the high voltage generating circuit 24 and to the sampling setting circuits 32 and 33.

The circuits 32 and 33 set a first sampling timing and a second sampling timing, respectively. The sampling setting circuit 32 determines a first sampling time to open the gates of the second and third sampling gate circuits 28 and 30 when the predose component which is produced by the excitation of the ultraviolet rays and has a high fluorescent intensity is fully decayed after the Schmidt circuit 31 receives the standard fluorescent pulse. During the first sampling time, the exposed fluorescent pulses and the standard fluorescent pulses are sampled and are sent to the succeeding integrators 34 and 35. On the other hand, the sampling setting circuit 33 sets a second sampling time in which only the predose component with a slow decay characteristic is sampled when the fluorescent component has been fully decayed. During the second sampling time, the gate of the first sampling gate circuit 27 is opened. The predose component having the slow decay characteristic is sampled and is sent to the succeeding integrator 36. The sampled values are integrated as an average direct current by the integrators 34 to 36 and are sent to the operation and processing device 37.

The operation and processing device 37 subtracts the integrated value obtained by the integrator 36 from the integrated value obtained by the integrator 34, whereby the RPL contained in the detected fluorescence during the first sampling time is detected. The means 37 calculates the ratio of the RPL component to the integrated value obtained from the integrator 35 and corrects the deviation of the RPL component due to the deviation in the intensity of the ultraviolet pulses. Finally, the means 37 determines the corrected RPL component as the exposure dose of the fluorescent glass element 15, and this value is displayed on a display 38.

Figure 2:
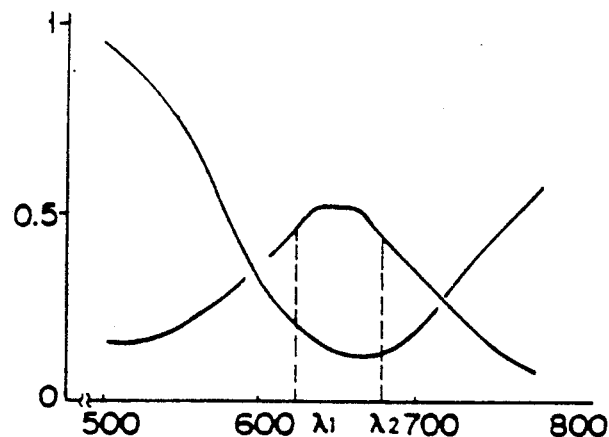
FIG. 2 is a characteristic chart between the wavelengths as one party and the predose component and RPL as the other party, of the arrangement shown in FIG. 1.

With this embodiment, since the fluorescent pulse component in a specific wavelength range from $\lambda_1$ to $\lambda_2$ is selected from the whole fluorescence, that is, in the wavelength range in which, as shown in FIG. 2, the fluorescence intensity of the RPL is large and the fluorescence intensity of the predose component is small, the predose component having a slow decay characteristic is reduced to $\frac{1}{2}$ to 1/5 of the predose obtained from the conventional method and apparatus. This reduction of the predose increases the sensitivity of the photomultiplier tube, such that a low RPL intensity is detected at a high sensitivity. Further, with the conventional method and apparatus, the measured predose varies according to the characteristic the photomultiplier tube. With this invention, however, of filtering the fluorescence in a specific wavelength region eliminates the dependency on the spectroscopic characteristics of the photomultiplier tubes, such that no consideration needs to be paid to the characteristics of the photomultiplier tubes. Still further, the reduction of the ratio of the predose to the RPL renders the subtracted value of the dose small, enabling the resolving power of the operation to be higher so as to carry out the measurement at a high accuracy.

In the above embodiment, an interference filter is used as a wavelength selecting element. However, it is possible to combine the interference filter with a color glass filter or to use a prism or a diffraction grading. In addition, various modifications are possible for the light source for the exciting ultraviolet rays, the fluorescent pulse detectors and the like within the scope of this invention.

Figure 3:
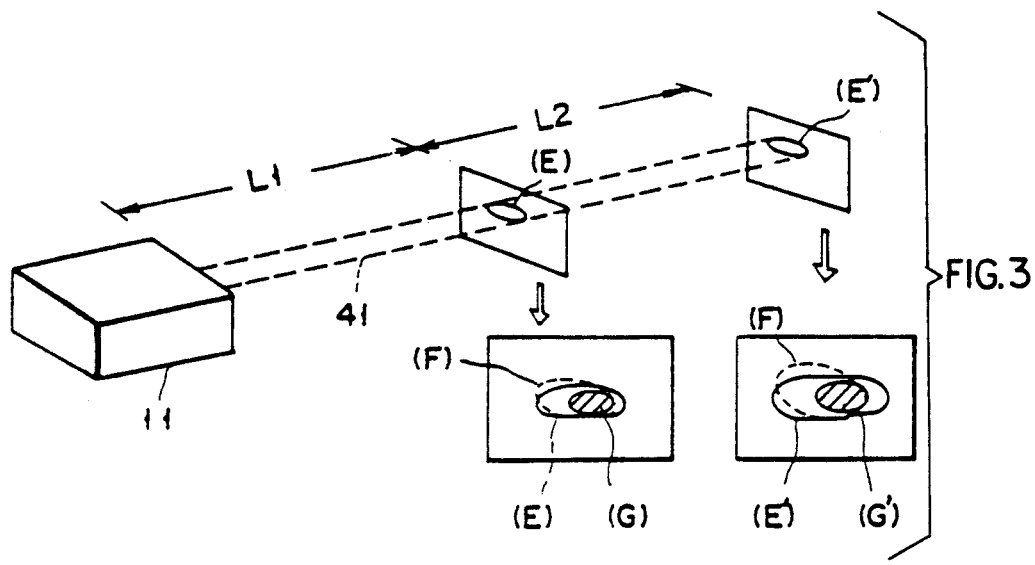
FIG. 3 illustrates the relations between the deviation of the intensity and the intensity distribution of the laser beams as one part and the distances from the nitrogen gas laser unit as the other part.

An embodiment of this invention will be explained with reference to FIGS. 3 to 5. In these figures, especially in FIG. 4 the same elements as those in FIG. 1 are denoted by the same reference numerals and their detailed explanation will be omitted. In this case the apparatus for reading glass dosimeters is similar in structure to that of FIG. 1 except for the optical system. The optical system will be explained in detail.

Generally, the ultraviolet laser generated from the nitrogen gas laser unit 11 is transmitted to the fluorescent glass element 15 and the reference fluorescent glass element 17 via the color filter 13, the semitransparent mirror 14 and the reflecting mirror 16, as also shown in FIG. 1. The intensity distribution on a plane perpendicular to the fluorescent laser is shown in FIG. 3. The ultraviolet laser beams 41 emitted perpendicularly to the above-mentioned plane from the outlet of the nitrogen gas laser unit 11 form an area E shown by a solid line with a deviation F shown by a dotted line and slightly deflected leftward at the distance L1 from the nitrogen gas laser unit 11. The portion showing the prominently strong intensity is hatched at G. At the distant L1+L2 from the nitrogen gas laser unit 11, the ultraviolet laser beams 41 form a larger circle area E'. The deviation F' and the portion G' showing the prominently strong intensity are also expanded. This means that the intensity distribution across the ultraviolet laser changes depending on the distance from the outlet of the nitrogen gas laser unit 11. Since this causes the intensity deviation of the ultraviolet pulses, the exposure dose of the fluorescent glass element exposed to radiation cannot be measured at a high accuracy without making a proper correction of the intensity distribution.

Figure 4:
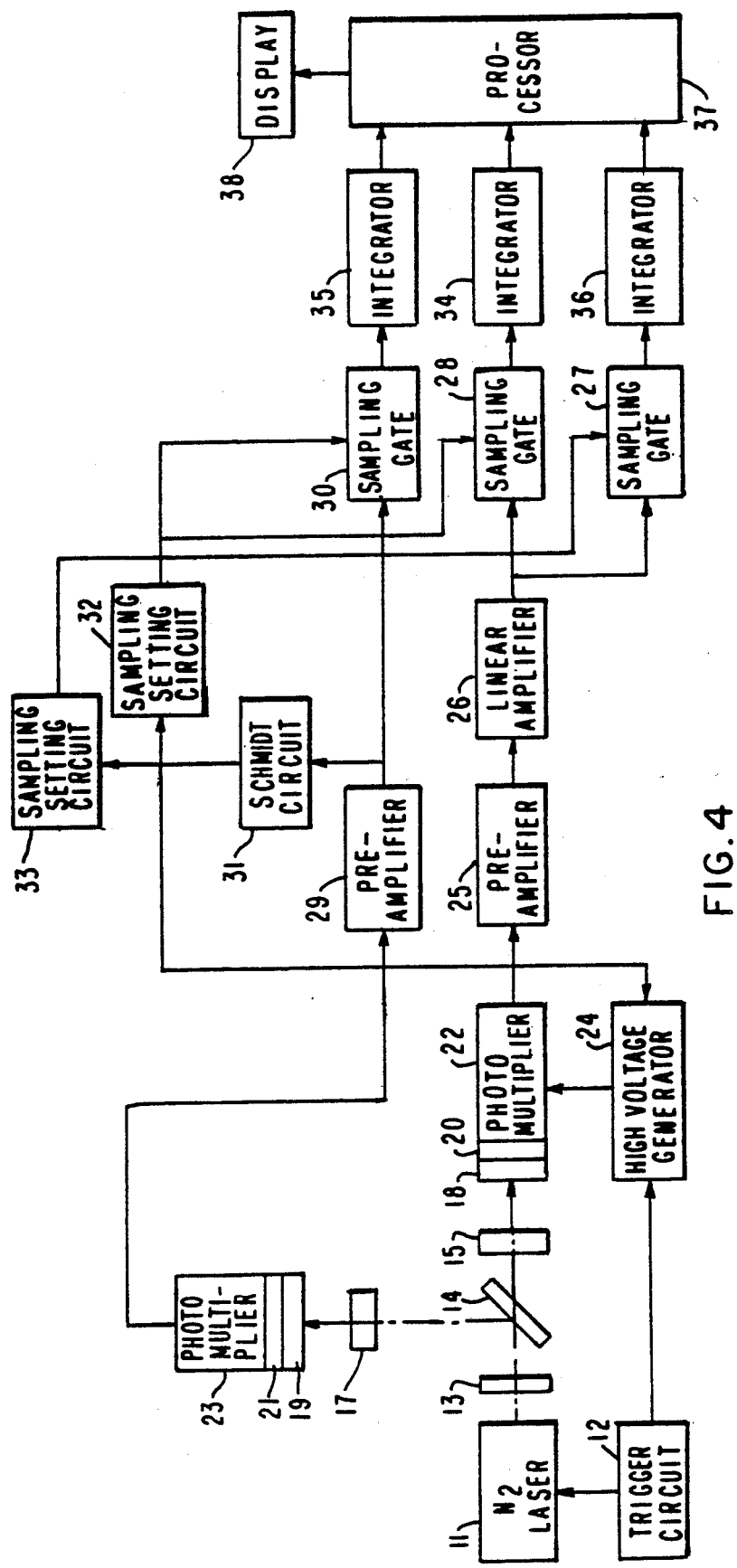
FIG. 4 is a block diagram showing an apparatus according to this invention.
Figure 5:
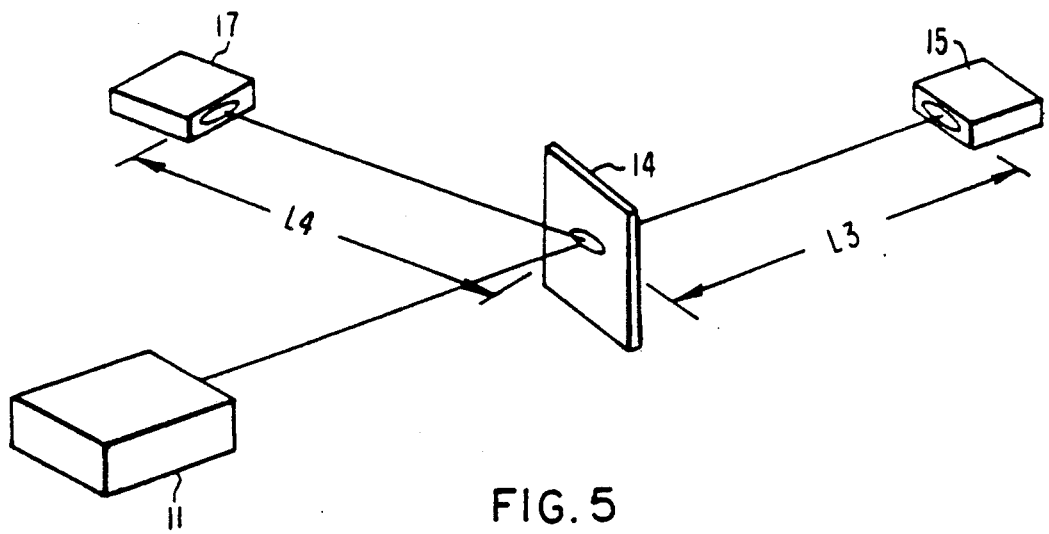
FIG. 5 shows the arrangement of an optical system for use in the apparatus of FIG. 4.

With the second embodiment of the apparatus according to this invention, as shown in FIGS. 4 and 5, the reflecting mirror 16 in FIG. 1 is removed, and a fluorescent glass element 15 that was exposed to radiation and a reference fluorescent glass element 17 are arranged at positions separated from a semitransparent mirror 14 by the same distance L3 and L4 such that both fluorescent glass elements always receive the same intensity distribution of the beams of exciting ultraviolet pulses. This arrangement facilitates an easy and accurate correction of any intensity deviation of the exciting ultraviolet pulses and the accurate measurement of the exposure dose of the fluorescent glass element 15 exposed to radiation as well. The operation of this apparatus is similar to the embodiment of FIG. 1, the explanation thereof being omitted.

Even if the intensity and intensity distribution of laser emitted from the nitrogen gas laser unit 11 which produces exciting ultraviolet light pulses change, the intensity distributions of the exciting ultraviolet pulses transmitted to the fluorescent glass element 15 exposed to the radiation rays and the standard fluorescent glass element 17 are similar to each other and the ratio of the fluorescent pulses emitted from the fluorescence detecting face of the fluorescent glass elements 15 and 17 is constant. As a result, the deviations of the intensity and intensity distribution of laser from the nitrogen gas laser unit 11 can be accurately corrected, and the measurement can be carried out at a high accuracy.

This invention is not limited to the above-mentioned embodiments. For example, a beam splitter may be used instead of the semitransparent mirror 14, or the beams may be transmitted to the fluorescent glass elements 15 and 17 independently of the semitransparent mirror 14 by means of glass fibers after the beams have been divided by the semitransparent mirror 14. When the optical lengths from the mirror 14 to the fluorescent glass elements 15 and 17 are unequal to each other, the diffused beams may be converged by a lens or the like such that the size of the beams incident on both the fluorescent glass elements are rendered equal to each other. In addition, various modifications of the light source for exciting ultraviolet rays, the fluorescent pulse detector and of other elements are possible within the scope of this invention.

Another embodiment of this invention will be explained. The technical feature of this embodiment resides in that the factor for correcting the fluorescent decay characteristic and/or the sensitivity characteristic for each fluorescent glass element are automatically stored and controlled.

Figure 6:
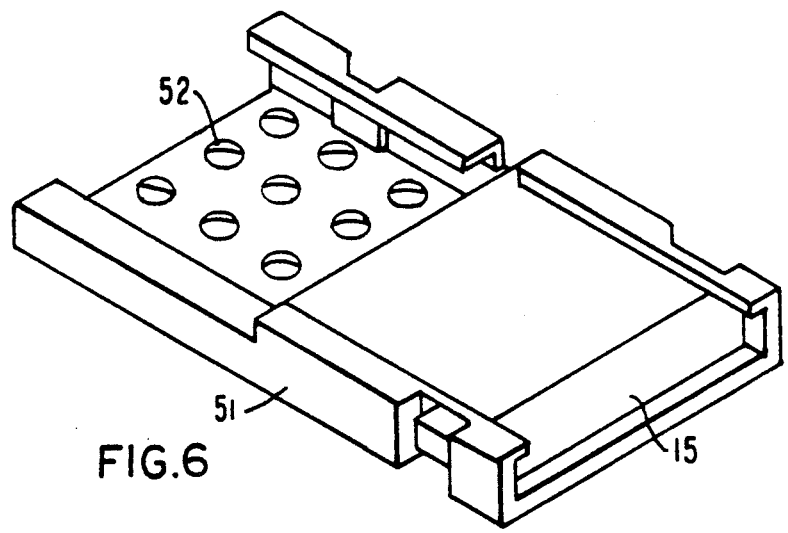
FIG. 6 is a perspective view of a glass element holder having a fluorescent glass element and a recognition code.

As shown in FIG. 6, a fluorescent glass element 15 is received on one half portion of a glass element holder 51. In the other half portion of the holder 51 are formed indexing holes 52 as a recognition code part for recognizing the glass element holder 51. Since the fluorescent glass element 15 is rarely removed from the glass element holder 51, the indexing holes 52 are used to identify the glass element holder 51, and the workers at a nuclear power facilities who carry fluorescent dosemeter and fluorescent glass elements 15 can also identify the fluorescent glass elements 15.

Figure 7:
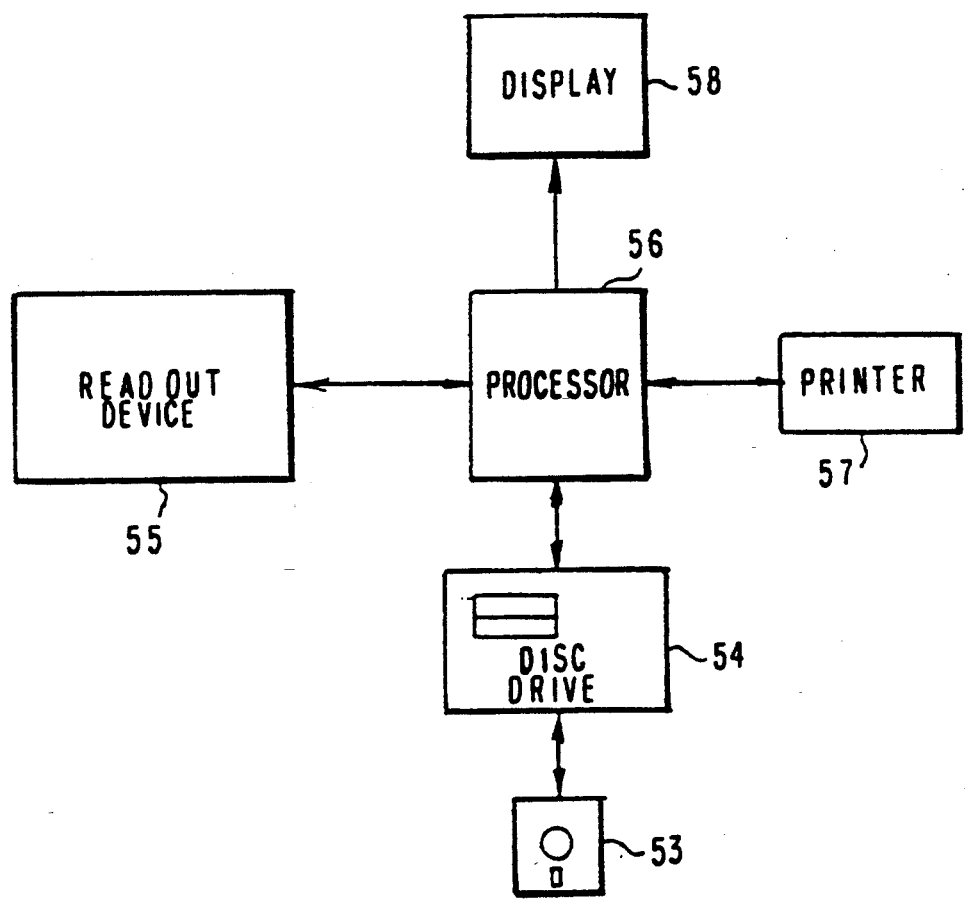
FIG. 7 is a block diagram in which the correction factors of each fluorescent glass element are controlled and the measured exposure dose is corrected.
Figure 9:
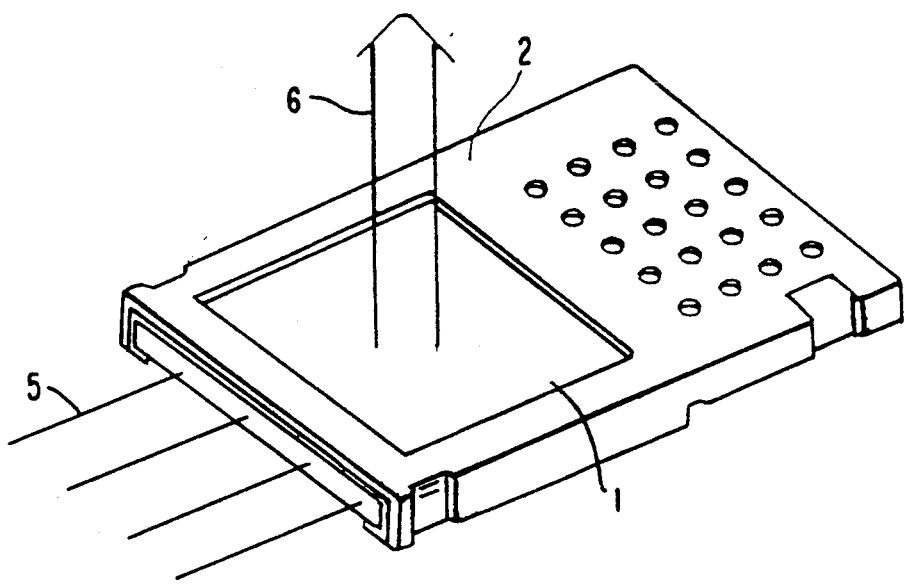
FIGS. 8 and 9 illustrate a conventional method and apparatus, FIG. 8 being an exploded perspective view of a fluorescent glass dosemeter, and FIG. 9 showing the state in which the exciting ultraviolet rays are emitted to the fluorescent glass element of FIG. 8 and the fluorescent light generated therefrom.
Figure 8:
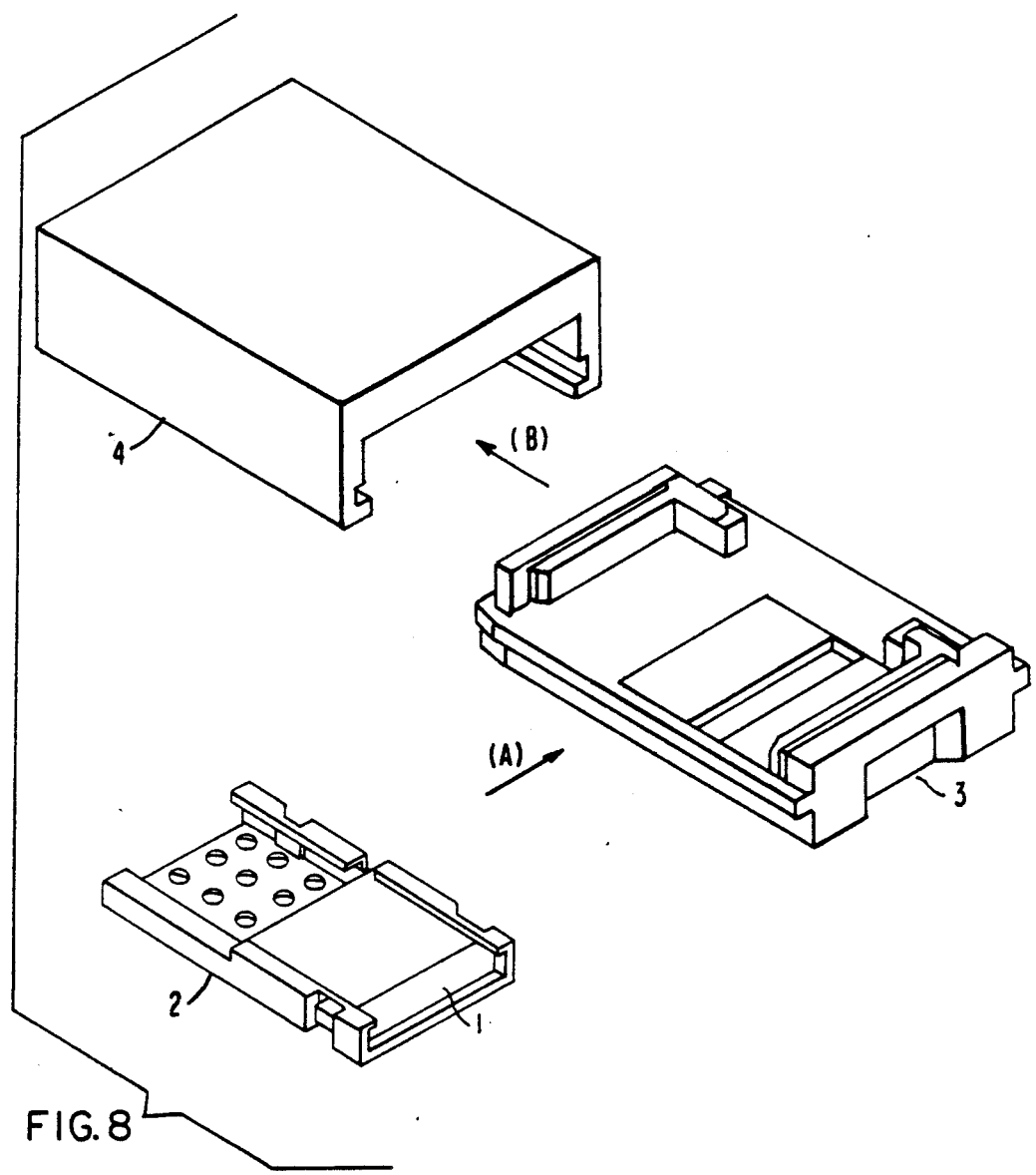

With this embodiment, the correction factors are processed by a device as shown in FIG. 7. First, the correction factor of the fluorescent decay characteristic and the correction factor of the sensitivity characteristic of each fluorescent glass element 15 are stored in a data memory device such as a floppy disc 53 so that the data memory device identifies the recognition code defined by the indexing holes 52. During the measurement of the exposure dose of the fluorescent glass elements 15, the floppy disc 53 is installed in a disc drive unit 54. Reference numeral 55 designates read-out device for reading also the data from the indexing holes 52 of the glass element holder 51, an exciting ultraviolet pulse generator for reading the fluorescent light generated by the fluorescent glass element 15, the optical system, the photomultifier tube and the like. Reference numeral 56 indicates operating and processing means for calculating the proper exposure dose of each fluorescent glass element 15 in accordance with the recognition code and the amount of the fluorescent light both read by the read-out device 55, and the correction factor stored in the floppy disc 53 within the disc drive unit 54. Reference numeral 57 depicts a printer; and referential numeral 58, a display of CRT, etc. The correction factor of the fluorescent decay characteristic is previously obtained by processing, on the device as shown in FIG. 7, each new fluorescent glass element before it has been exposed to radiation, and the value is stored in the floppy disc 53. The correction factor of the sensitivity characteristic of each fluorescent glass element is similarly stored in the floppy disc 53 in advance.

With this embodiment, the reading of the exposure dose of a great number of fluorescent glass elements 15 exposed to radiation can be started after the floppy disc 53 storing the data concerning the recognition codes, the fluorescent decay characteristic, and the sensitivity characteristic has been installed in the disc drive unit 54. The read-out device 55 reads the recognition code from the indexing holes 52 of the glass element holder 51, and then reads the exposure dose emitted from each fluorescent element 15 exposed to radiation. The operation and processing means 56 compares the read recognition code with the codes stored in the floppy disc 53 at a high speed. When the code is identified, the means 56 reads out the data on the correction factor of the fluorescent decay characteristic and the correction factor of the sensitivity characteristic of the fluorescent glass element whose code is identified. The exposure dose read by the read-out device 55 is corrected based on the correction factors, and corrected exposure dose is displayed on the display 58 or is printed out by the printer 57.

With this embodiment, a floppy disc 53 is used. However a hard disc or other memory means may be employed. Needless to say, various modifications of the constituent devices are possible.

As explained above, this invention has the following technical advantages:

First, a fluorescent pulse component in a specific wavelength range is selected from fluorescent pulses by means of a wavelength selecting element or the like. This provides for the measurement of the RPL when the predose component having a slow decay characteristic is at a low level. Therefore, the sensitivity of the photoelectric detector is increased to measure low RPL intensity at a high sensitivity. Since the ratio of the predose to the RPL component is small, the amount of the predose to be subtracted is also small, and the resolution power of the operation is high. Thus, the measurement can be carried out at a high accuracy. Further, the amounts of the predose differ from each other due to the difference of the spectral sensitivity characteristics of the photoelectric detectors. However, the method and the apparatus of this invention are not influenced by the characteristic of the photoelectric detectors, and thus it is unnecessary to select the characteristic of the detectors, facilitating easy maintenance of the apparatus. Still further, the use of the wavelength selecting element renders the apparatus simple and compact, and provides a very effective means for radiation control at a high sensitivity and at a high accuracy.

Secondly, the intensities and the intensity distributions of the ultraviolet pulses transmitted to the fluorescent glass element exposed to radiation and the reference fluorescent element are similar to each other, and the ratios of the fluorescent pulses produced by both the fluorescent glass elements are constant. Therefore, the deviations of the intensity and the intensity distribution are properly corrected.

Lastly, the recognition code and the correction factors for each fluorescent glass element are stored, and the exposure dose is corrected in accordance with the correction factors of each fluorescent glass element whose recognition code is read at the time of the reading of the exposure dose. Therefore, the correction is made at a high accuracy, and the exposure dose of each fluorescent glass element is read at a high accuracy. This arrangement does not need the manual input of the correction factors and facilitates the continuous reading of the exposure dose of fluorescent glass elements, thereby simplifying the measurement substantially.

What is claimed is:

1. In an apparatus for reading a glass dosimeter including a fluorescent glass element which was exposed to ionizing radiation, said apparatus comprising a nitrogen gas laser unit for producing exciting ultraviolet pulses, an optical system for transmitting the exciting ultra-violet pulses produced in said nitrogen gas laser unit to said fluorescent glass element to generate fluorescence pulses thereof, means for transmitting only a part of said exciting ultraviolet light pulses to the fluorescent glass element, and for transmitting another part of said exciting ultraviolet light pulses to a standard fluorescent glass element with a given predose luminescence, and first and second photoelectric detectors provided for separately detecting the fluorescence pulses produced in said fluorescent glass elements and operative means for calculating the exposure dose of said fluorescent glass element from the fluorescence intensity detected by said photoelectric detectors the improvement comprising ultraviolet light eliminating filters and wavelength selecting elements arranged between said fluorescent glass elements and the respective photoelectric detectors for selectively filtering fluorescent pulse components in a specific wavelength range so as to cause fluorescence intensity resulting from the radiation exposure to be high relative to and that resulting from the predose is for improved distinction therebetween for compensation in said operative means for predose luminescence present in the fluorescent glass element which was exposed to radiation.

2. An apparatus according to claim 1, wherein said fluorescent glass element exposed to the radiation and said standard fluorescent glass element are arranged in such positions that they are separated from said nitrogen gas laser unit by the same optical distance.

3. In an apparatus for reading a glass dosimeter in which a fluorescent glass element which was exposed to ionizing radiation is supported by a glass element holder and is subjected to exciting ultraviolet light pulses, from a nitrogen gas laser unit so as to generate fluorescence of the glass element with an intensity corresponding to ionizing radiation dose to which the glass element was exposed, means for determining the radiation dose from the fluorescent light intensity of said fluorescent glass element are provided, the improvement comprising: a recognition code reading device for reading a recognition code attached to said glass element holder; a data memory device for storing correction data for fluorescence decay characteristics and/or for sensitivity characteristics of various glass elements; and an operating and processing device for reading out corresponding correction data from said data memory device in accordance with the recognition codes read by said recognition code reading device, for correcting the fluorescence intensity of each fluorescent glass element and for calculating exposure dose of the fluorescent glass element.

4. An apparatus according to claim 3, wherein means are provided for transmitting only a part of said exciting ultraviolet light pulses to the fluorescent glass element and for transmitting another part of said exciting ultraviolet light pulses to a standard fluorescent glass element with a given predose luminescence and first and second photoelectric detectors are provided for separately detecting the fluorescence pulses produced in said fluorescent glass elements for correction in said operating and processing device of the radiation dose determined from the fluorescent light intensity of said fluorescent glass element, wherein said fluorescent glass element exposed to the radiation and said reference fluorescent glass element are arranged in such positions that they are separated from said nitrogen gas laser unit by the same optical distance.

* * * * *